United States Patent Office 2,771,479
Patented Nov. 20, 1956

2,771,479
INSECTICIDAL COMPOUNDS

Herman S. Bloch, Chicago, Ill., assignor to Universal Oil Products Company, Chicago, Ill., a corporation of Delaware No Drawing. Application October 17, 1949,
Serial No. 121,890

11 Claims. (Cl. 260—407)

This invention relates to organic compounds useful as insect toxicants formed in the present process by the condensation of a polyhalogenated cyclic conjugated diene with an unsaturated acid of the fatty acid series or certain of its derivatives and particularly its mono- and polyhydric alcohol esters. More specifically, the invention concerns a process for the production of polycyclic compounds containing multiple nuclearly substituted halogen substituents selected from the group consisting of fluorine and chlorine and containing, in addition, a fatty acid-solubilizing carboxylic acid or ester group which adds to its efficacy as an insect toxicant.

The cyclic halogen substituted compounds herein provided are dependent for their lethal effects to insect life not only upon their inherent toxicity arising from their specific structure and composition but also upon the ability of the toxicant to penetrate the usually tough, hard outer sheathing or cuticle protecting the insect, enter into the circulatory system of the insect and subsequently attack the vulnerable nerve centers of the insect. The preferred compounds of the present process being formed from the fatty unsaturated carboxylic acids and their esters in themselves resemble fatty materials capable of absorption and assimilation in the fatty tissues of the insect, thereby gaining admittance into the circulatory system of the insect which distributes the poison to the vital nerve centers where the poison has its effect. The present halogen substituted cyclic compounds being of relatively high molecular weight and hence of relatively low volatility, are retained on the insect for long periods following their application such that when contact of the insect with the insecticidal compound is once obtained, the death of the insect is ultimately assured. A further advantage of the present insecticides is the solubility of some of the compounds in water and the ability of others to become finely suspended in water as an emulsion, thus enabling the insecticide to be widely dispersed in the form of a composition which wets the surface of the insect, plant foliage or other surface to which the composition is applied. The compounds are effective in relatively weak concentrations and hence may be formulated into economically applied compositions having the same optimum efficiency in killing action as a greater quantity of the active ingredient itself.

In one of its embodiments, the present invention concerns an insecticidal compound formed by the controlled thermal condensation of a compound selected from the unsaturated fatty acids, their alcohol esters and their amine and metallic salts with a polyhalogen substituted cyclic conjugated diene wherein the halogen substituents are selected from the group consisting of fluorine and chlorine radicals.

A more specific and preferred embodiment of the invention concerns an insecticidal compound formed by reacting a chlorine substituted cyclic conjugated diene with an unsaturated fatty acid glyceride at a temperature of from about 100° to about 300° C. to form a multiple chlorine substituted cyclic carboxylic acid glyceride.

The present insecticidal compounds are of bicyclic structure having the following typical empirical formulae, representing the condensation product of a polyhalogenated cyclic conjugated diene with a fatty acid or a derivative thereof containing at least one olefinic double bond in the fatty acid portion of the molecule:

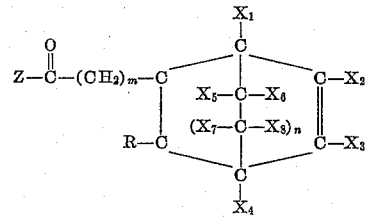

wherein R is selected from the group consisting of hydrogen, alkyl, alkenyl and cyclo alkyl radicals, Z is selected from the group consisting of amino, substituted amino and the group —OY wherein Y is selected from the group consisting of ammonium, substituted ammonium, hydrogen, alkyl, alkenyl, cyclo alkyl, and metallic radicals, $X_1$–$X_8$ are selected from the group consisting of hydrogen, alkyl, fluoro and chloro radicals, at least two of said radicals $X_1$–$X_8$ consisting of said fluoro and chloro radicals, $n$ is a numeral having the value of zero or one and $m$ is a whole number having a value of from 0 to about 15, depending upon the position of the olefinic bond in the aliphatic chain of the unsaturated fatty acid or ester utilized as one of the primary reactants in the formation of the present insecticidal compounds. The value of $n$ being selected from the numerals 0 and 1 is determined by the alternative selection of polyhalogenated cyclopentadiene or polyhalogenated cyclohexadiene as the other of the primary reactants condensed with an unsaturated fatty acid or ester in the present process.

The polyhalogenated conjugated diene reactant utilized in the preparation of the present compounds are selected from the halogen substituted cyclopentadiene and cyclohexadiene compounds containing up to a total of about 10 carbon atoms per molecule, depending upon the structure and desired molecular weight of the resulting condensation product. The products having useful insecticidal properties are prepared from the conjugated dienes substituted by fluorine and chlorine radicals, the halogen substituents being either uniformly or heterogeneously selected from the alternative halogen species to provide either the corresponding uniform or mixed halogen-substituted condensation products. The corresponding bromine compounds may also be used, but their high cost makes them less attractive from a practical viewpoint. The completely halogen substituted cyclopentadiene and cyclohexadiene compounds, such as hexachlorocyclopentadiene, are the preferred reactants herein because of their general availability and the high degree of toxicity of the resulting condensation products produced therefrom, although for certain purposes the halogen substituted compounds of a lesser degree of substitution may be desired, as for example, to control the toxicity or the physical properties of the ultimate condensation product. The fluorine or chlorine substituted cyclic dienes of which hexachlorocyclopentadiene is a preferred member containing at least two of said halogen groups per molecule, are preferably substituted on the singly bonded pair of carbon atoms constituting the conjugated diene system of carbon atoms, that is, the central carbon atoms of the system:

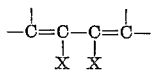

as it is believed that the halogens occupying the latter position exert the greatest effect in determining the toxicity of the ultimate condensation product. The halogen substituted conjugated dienes may also contain other diverse substituents such as one or more alkyl radicals, preferably methyl or ethyl groups, nitro, sulfonic or nitrile radicals which modify the physical properties of the resulting product or adapt the latter to a particular use, such as affecting the miscibility of the condensation product with water, as for example, in the case of a sulfonic acid group present on the condensation cyclic portion of the molecule. The halogen substituted cyclopentadienes and cyclohexadienes desirably contain not more than about 10 carbon atoms per molecule as their activity in the condensation reaction generally declines as the number and chain length of alkyl substituents on the cyclo diene nucleus increases, essentially being the effect of steric hindrance. Typical of the conjugated cyclic dienes containing at least two halogen radicals per molecule selected from the group consisting of fluorine and chlorine are such compounds as 2,3-dichlorocyclopentadiene, 5,5-difluorocyclopentadiene, 5-methyl-1,2,3,4-tetrachlorocyclopentadiene, 5,6 - dimethyl - 1,2,3,4-tetrachlorocyclohexadiene - 1,3,6 - tert. - butyl - 1,2,3,4 - tetrachlorocyclohexadiene - 1,3 and other homologous and isomeric halogen analogs containing up to about 10 carbon atoms per molecule. For added stability, it is preferred that if the methylene groups of the cyclic dienes are halogen-substituted they be fully substituted. The preferred polyhalogenated cyclo dienes of the above alternative reactants are the chlorine substituted compounds containing not more than one alkyl substituent, the latter compounds being preferred on the basis of their generally greater reactivity in the condensation reaction, producing higher yields of condensation products and the generally greater toxicity of the compounds resulting from their condensation with the unsaturated fatty acid and fatty acid derivative reactants. On the basis of other considerations such as density, solubility in water or organic solvents, volatility, etc., reactants other than the above designated preferred members may be utilized to advantage, although at some sacrifice in yield and/or toxicity of the resulting product.

The reactants condensed with the polyhalogenated cyclic conjugated diene in accordance with the present condensation reaction are herein designated as unsaturated fatty acids and their derivatives which, in general, impart oleaginous characteristics to the condensation product, enabling the latter to be assimilated by the insect and to enter its circulatory system. By derivatives I mean compounds containing functional groups easily derivable from the carboxylic acid group, such as certain salts, esters, amides, and nitriles. The fatty acids or their derivatives utilized as reactants are preferably of relatively high molecular weight containing at least 8 carbon atoms per molecule such that the resulting condensation product possesses the desired fatty characteristics. It is however, within the operation of the present process to employ unsaturated fatty acids and esters having fewer than about 8 carbon atoms per molecule and where high molecular weight of the ultimate condensation product is not a desired characteristic, as for example, in a particular use of the insecticidal compound in which it is preferred that the insecticide evaporates readily from the surface to which it is applied, as in the case of spraying vegetation intended for subsequent human consumption, such lower molecular weight fatty acids and esters may be utilized in the present condensation reaction to obtain the desired physical properties of the product. In the case of fatty acids and their derivatives containing more than one olefinic bond per acid radical, and especially, in the case of fatty acids containing a conjugated pair of olefinic bonds in their structure, such as linseed oil, or dehydrated castor oil, respectively, etc., more than one double bond of the system may condense with the conjugated diene system of the polyhalogenated cyclic diene reactant to form more than one polyhalogenated cyclic group, which may or may not be separated by poly methylene groups in the resulting condensation product depending upon whether the double bonds were or were not initially conjugated. When employed as reactants herein, the unsaturated fatty acid esters may include the mono- and polyhydric alcohol esters and their polymers, such as esters of ethylene glycol, polymeric glycols, such as polyethylene glycol, glycerol, inositol, pentaerythritol, etc., the esters including the poly as well as the mono-esters of the polyhydric alcohols; the esters or amides of aminoalcohols are also included as capable of forming useful derivatives. Naturally occurring unsaturated fatty acid esters and mixtures utilizable as charging stock in the present process are such triglycerides as linseed oil, tung oil, oiticica oil, dehydrated castor oil, cottonseed oil, olive oil, perilla oil, cocoanut oil, soybean oil, etc. The fatty acids recovered by hydrolysis of typical unsaturated oils may also be employed as reactants in the present process, such as oleic or elaidic acid, linoleic acid, linolenic acid, ricinoleic acid, etc. The preferred reactants contain a single double bond per acid group, since a single cyclic halogen-containing group added thereto is highly toxic to insects. Oleic acid and its esters, such as the glyceride trioleins and mixed oleic-linoleic glycerides recoverable from soybean oil or linseed oil produces especially effective insecticidal compounds.

The condensation reaction of the present process wherein the unsaturated fatty acid or derivative thereof is reacted at condensation conditions with a polyhalogen substituted conjugated cyclic diene is effected by thermal means, the temperature of the reaction mixture being controlled throughout its duration in order to prevent the reaction mixture from becoming overheated causing discoloration and charring or decarboxylation of the reactant and/or product. The reaction is usually effected at a superatmospheric pressure, above about 2 atmospheres to thereby maintain the reaction mixture in substantially liquid phase. Although an approximately stoichiometric ratio of the reactants, based upon each molecule of cyclic diene reacting with each olefinic bond of the unsaturated fatty acid or ester, is generally operable, it is preferred to maintain the proportion of polyhalogenated cyclic diene somewhat in excess in the reaction mixture, usually from about 1.5 to about 10 stoichiometric proportions, based as aforesaid on the number of olefinic bonds in the unsaturated fatty acid available for condensation with the conjugated cyclic diene reactant, thereby consuming the fatty acid ester reactant substantially to completion during the reaction and eliminating the problem of separating excess fatty acid or esters from the ultimate reaction mixture. The elimination of the fatty acid or ester from the reaction product mixture is generally preferable because of the relatively greater volatility of the cyclodiene reactant, thereby making the purification of the product and its separation from the reaction mixture more easily effected than in the case of utilizing an excess of the less volatile and therefore, less readily separable fatty acid or ester reactant in the reaction mixture. The residue comprising the desired condensation product following the completion of the reaction may be further purified, for example, by recrystallization, vacuum distillation, solvent extraction or other means known to the art, or, if suitable, the recovered reaction mixture may be utilized directly without further treatment for the preparation of an insecticidal composition.

The condensation reaction herein provided is effected at a temperature of from about 100° to about 200° C., accompanied by agitation of the reaction mixture to maintain the reactants in intimate admixture.

The volatility and retentive capacity of the present condensation products on the article to which the insecticidal composition is applied may be varied at will by combining insecticidal compounds with suitable fixing agents which reduce their volatility or with organic solvents, etc. which promote their volatilization as desired. Thus, the compounds may be dissolved in a suitable high boiling solvent such as a mineral or vegetable oil, petrolatum, etc., a wax such as paraffin wax, beeswax, etc., a high molecular weight alcohol or ether such as myricyl alcohol, dibutyl ether, etc., an oleoresinous paint vehicle or ingredient thereof, such as a drying oil, resin, etc., or they may be emulsified with water by the addition of an emulsifying agent, such as a detergent to an aqueous suspension of the components which is thereafter stirred or otherwise agitated to intersperse the normally immiscible phases. The latter solvents and dispersants may also be employed for the specific purpose of reducing the concentration of the active insecticide to a desirable formulation. The alkali metal, ammonium, and substituted ammonium salts of the acidic adducts are especially easily water-soluble or dispersible, and certain of the heavy metal salts (e. g. copper, lead) are of special toxicity, although their harmfulness to warm blooded animals is also appreciable. Of the substituted ammonium salts, the mono-, di- and tri-alkyl, and particularly, the methyl amine salts of the indicated fatty acids are especially effective. The particular formulation of active components in combination with the solvent or dispersant will depend upon the application of the insecticide. A composition containing as high as 20% of active components may be preferred in some instances where deep penetration of insecticide is desired, as in the treatment of fibrous material, such as wood for the extinction of a particular infestation such as wood termites. For other purposes, the required concentration of active components in the formulation may be as low as about 0.1%, as for example, the treatment of fabrics for destroying moth larvae. In general, the present insecticidal compounds are utilizable in concentrations containing from about 1% to about 5% of the active component in the composition.

The choice of the most suitable solvent or dispersant further depends upon the method utilized to apply the composition to the infested article. For example, a low molecular weight normally gaseous carrying agent for the active component, such as butane, Freon, etc., may be compressed and liquefied into a small bomb containing the insecticidal compound and upon release of pressure from the bomb, the liquefied carrier vaporizes and suspends a quantity of the active components therein, thus providing a convenient spray method of applying the insecticide. The active component may also be dissolved in a liquid carrier such as kerosene, alcohol, etc., and the resulting solution utilized in a suitable spraying device. The material may also be absorbed on finely divided clays, earths, or other absorbent solids and dispersed as a dust.

The effectiveness of the present insecticides may be improved by using them in conjunction with others, toward many of which the compounds herein described likewise have a synergistic effect. Among the other insecticides which may be advantageously used with the present cyclic halogenated acid adducts are pyrethrum, rotenone, piperonyl butoxide, dichlorodiphenyltrichloroethane, the ethylphosphates, chlordan, benzene hexachloride, chlorinated camphene, insecticidal thiocyanates, and many other well-known insect toxicants of natural and synthetic origin.

This invention is further described with reference to the following illustrative examples which, although indicative of typical representative compounds of the present process are nevertheless not intended to limit the generally broad scope of the invention in strict accordance therewith.

*Example I*

Methyloleate was heated with 3 mols of hexachlorocyclopentadiene at 175° C. for six hours, after which the product was distilled to recover unreacted hexachlorocyclopentadiene. The residue was a mobile light-colored oil which, when dissolved in an odorless kerosene to give a 1% solution, produced excellent knock-down and kill (99% in 24 hours) of house-flies in a Peet-Grady test chamber.

*Example II*

The product of Example I was saponified at 30° C. with 0.1 N sodium hydroxide during a period of five hours. Only a small amount of water-soluble chlorides were formed. The product was dried to a white salt. A slightly milky 1% solution in water of this salt was about 75% as effective as the methyl ester of Example I in the Peet-Grady Test.

*Example III*

A refined soybean oil was heated for eight hours at 200° C. with 10 mols of hexachlorocylopentadiene, at the end of which time the unreacted diene was removed by distillation. A viscous light yellow syrup was left as a residue, which exhibited approximately the same killing power toward houseflies as the methylester of Example I but which showed poorer knockdown. When 0.025 g. pyrethrins was added per 100 ml. of 1% solution of the glyceride in deodorized kerosene, both the knockdown and the kill were excellent.

I claim as my invention:

1. The condensation product of a polyhalogenated cyclic diene selected from the fluoro and chloro poly substituted cyclopentadienes and cyclohexadienes containing not more than 10 carbon atoms per molecule with a compound selected from the fatty acids containing at least one double bond per molecule, and from their alcohol esters, amides and metallic, ammonium and substituted ammonium salts, said fatty acid compound containing at least 8 carbon atoms per molecule.

2. The condensation product of claim 1 further characterized in that said polyhalogenated cyclic diene is hexachlorocyclopentadiene.

3. The condensation product of claim 1 further characterized in that said compound is an unsaturated fatty acid glyceride.

4. The condensation product of claim 1 further characterized in that said compound is an unsaturated fatty acid ester of a monohydric alcohol.

5. The condensation product of claim 1 further characterized in that said compound is an unsaturated fatty acid methyl ester.

6. The condensation product of claim 1 further characterized in that said polyhalogenated cyclic diene is selected from the cyclopentadiene and cyclohexadiene compounds completely substituted by chlorine groups.

7. The condensation product of hexachlorocyclopentadiene with an unsaturated fatty acid containing at least one double bond and at least 8 carbon atoms per molecule.

8. The condensation product of hexachlorocyclopentadiene with an alcohol ester of an unsaturated fatty acid containing at least one double bond and at least 8 carbon atoms per molecule.

9. The condensation product of hexachlorocyclopentadiene with methyloleate.

10. The condensation product of hexachlorocyclopentadiene with an unsaturated glyceride oil.

11. The condensation product of hexachlorocyclopentadiene with soybean oil.

References Cited in the file of this patent

UNITED STATES PATENTS

| | | |
|---|---|---|
| 2,449,956 | Shokal et al. | Sept. 21, 1948 |
| 2,551,387 | Moffett et al. | May 1, 1951 |
| 2,606,910 | Herzfeld et al. | Aug. 12, 1952 |

FOREIGN PATENTS

| | | |
|---|---|---|
| 614,931 | Great Britain | of 1948 |
| 618,432 | Great Britain | of 1949 |

OTHER REFERENCES

Chemical Abstracts (1949), vol. 43, page 5796.